United States Patent [19]

Moy et al.

[11] Patent Number: 5,140,771
[45] Date of Patent: Aug. 25, 1992

[54] POWER WINDOW ACTUATOR

[75] Inventors: Curtis T. Moy, Grand Blanc; Orest Iwasiuk, Farmington Hills, both of Mich.

[73] Assignee: Masco Industries, Inc., Taylor, Mich.

[21] Appl. No.: 709,934

[22] Filed: Jun. 4, 1991

[51] Int. Cl.[5] ............................................. E05F 15/04
[52] U.S. Cl. ........................................ 49/340; 49/343
[58] Field of Search .................. 49/339, 340, 341, 342, 49/343, 344, 324, 108; 74/102, 104, 105

[56] References Cited

U.S. PATENT DOCUMENTS

| | | | |
|---|---|---|---|
| 1,644,691 | 10/1927 | Pritchard | 49/341 X |
| 2,237,576 | 4/1941 | Rakoczy . | |
| 2,371,336 | 3/1945 | Levon | 49/343 X |
| 2,767,979 | 10/1956 | Hummert . | |
| 3,020,039 | 2/1962 | Hynes et al. . | |
| 3,320,698 | 5/1967 | Hummel | 49/340 |
| 3,452,479 | 7/1969 | Bentley . | |
| 3,481,076 | 3/1970 | Bedard . | |
| 3,534,630 | 10/1970 | Schwerdhofer . | |
| 3,713,346 | 1/1973 | Chamberlain et al. . | |
| 4,068,799 | 1/1978 | Brodin . | |
| 4,186,524 | 2/1980 | Pelchat | 49/324 |
| 4,246,628 | 1/1981 | Ikemizu et al. . | |
| 4,249,771 | 2/1981 | Gergoe et al. | 49/324 X |
| 4,305,228 | 12/1981 | Nelson . | |
| 4,420,185 | 12/1983 | Bienert et al. . | |
| 4,471,251 | 9/1984 | Yamashita . | |
| 4,511,129 | 4/1985 | Kishino . | |
| 4,534,233 | 8/1985 | Hamaguchi . | |
| 4,860,493 | 8/1989 | Lense | 49/341 X |
| 4,866,882 | 9/1989 | Cappello . | |
| 4,885,948 | 12/1989 | Thrasher, Jr. et al. . | |
| 4,903,435 | 2/1990 | Bittman . | |
| 4,918,865 | 4/1990 | Hirai | 49/357 |
| 4,970,826 | 11/1990 | Richmond et al. . | |
| 4,987,791 | 1/1991 | Nakahashi et al. . | |

FOREIGN PATENT DOCUMENTS

| | | | |
|---|---|---|---|
| 0170989 | 7/1985 | European Pat. Off. . | |
| 3522706 | 1/1986 | Fed. Rep. of Germany | 49/343 |
| 3741615 | 12/1987 | Fed. Rep. of Germany . | |
| 348521 | 1/1930 | France | 49/341 |
| 11070 | of 1912 | United Kingdom | 49/343 |
| 531285 | 1/1941 | United Kingdom | 49/343 |
| 688417 | 3/1953 | United Kingdom | 49/343 |

Primary Examiner—Renee S. Luebke
Assistant Examiner—Jerry Redman
Attorney, Agent, or Firm—Myron B. Kapustij; Malcolm L. Sutherland; Leon E. Redman

[57] ABSTRACT

A vehicle power window actuator for pivoting a side glass view panel about an axis. The actuator is fixedly mounted on a vehicle body panel and is comprised of a housing containing screw spindle rotatable by a reversible electric motor, a follower axially displaceable on said screw spindle by rotation of said screw spindle, and link pivotably connected at one end to said follower and at the other end to a window glass pane connector assembly, said link telescopically slidable within said housing. Axial movement of the follower on the screw spindle in one direction causes extension of the link out of the housing thereby exerting a pushing force on the connector assembly thus pivoting the glass view panel outwardly to an open position. Axial movement of the follower on the screw in the other direction causes retraction of the link into the housing thereby exerting a pulling force on the connector assembly thus pulling the glass view panel inwardly to a closed position.

14 Claims, 3 Drawing Sheets

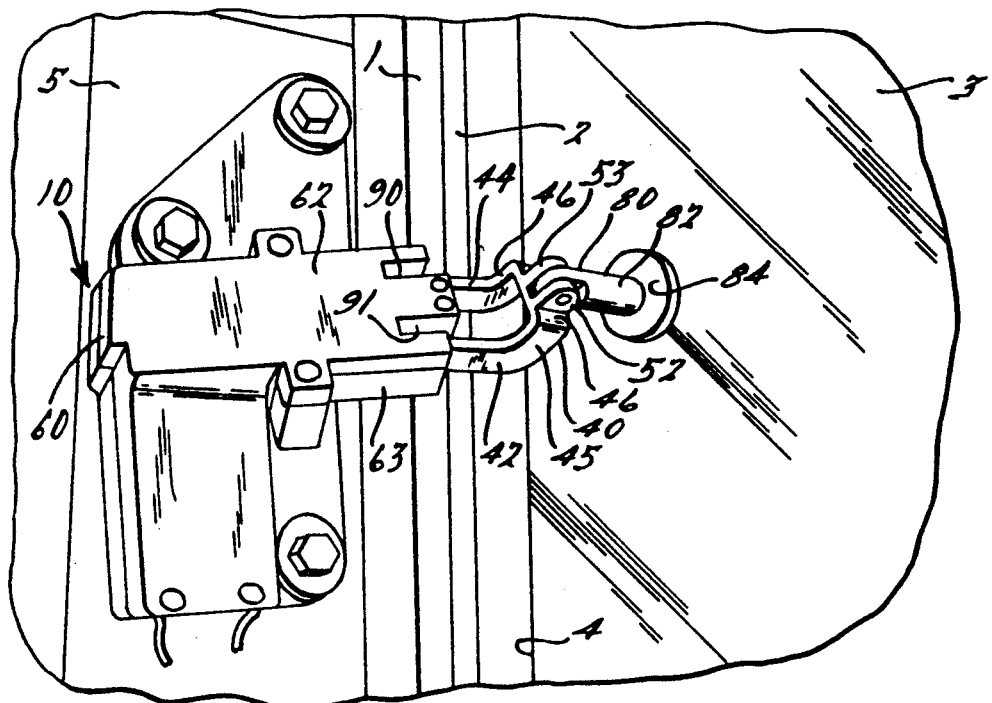
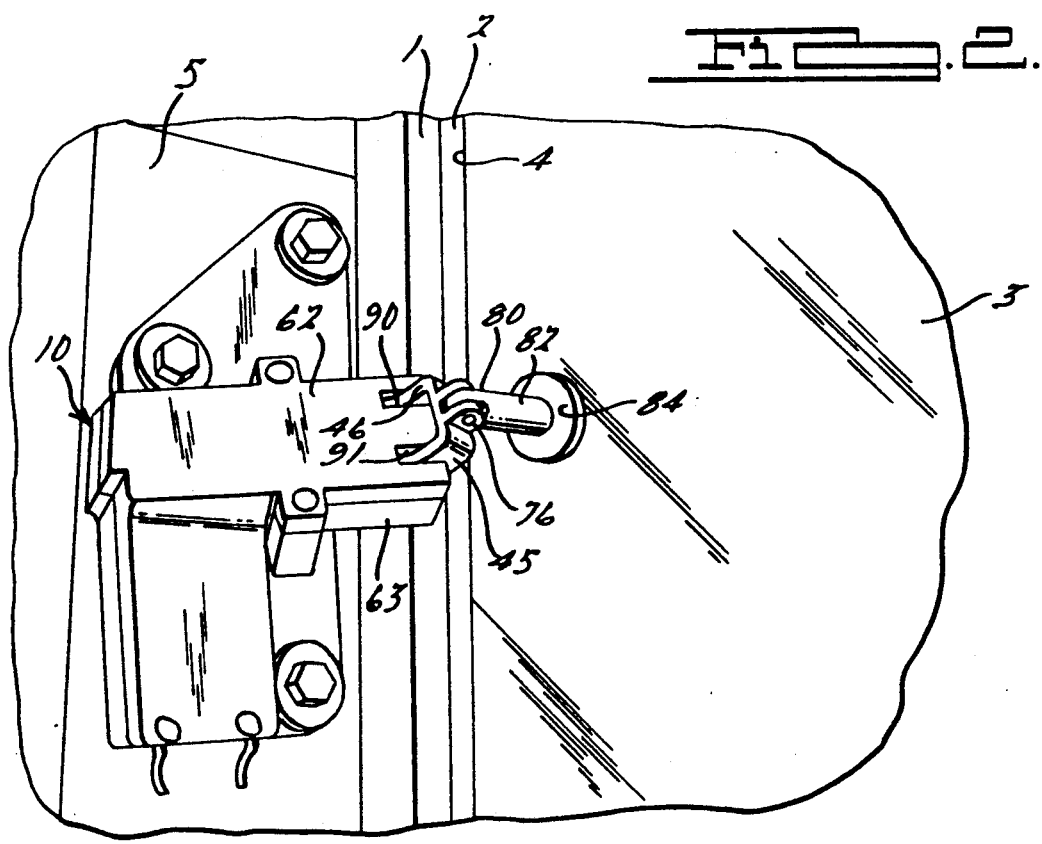

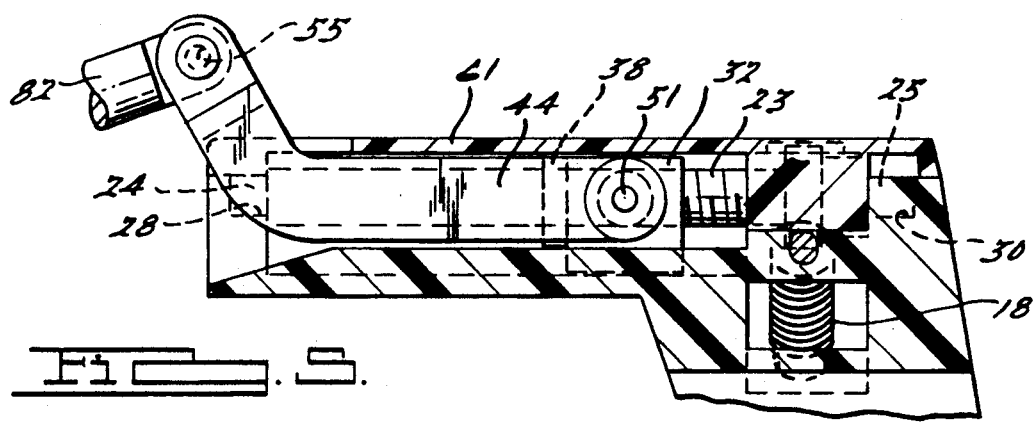
FIG. 5.
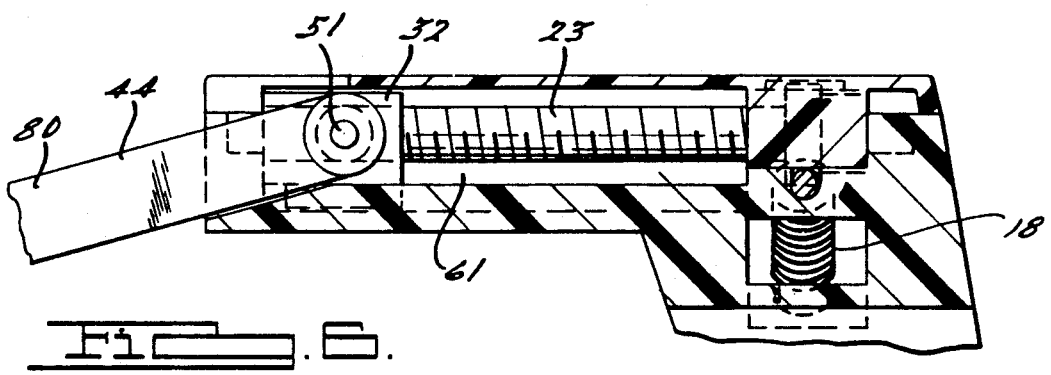
FIG. 6.
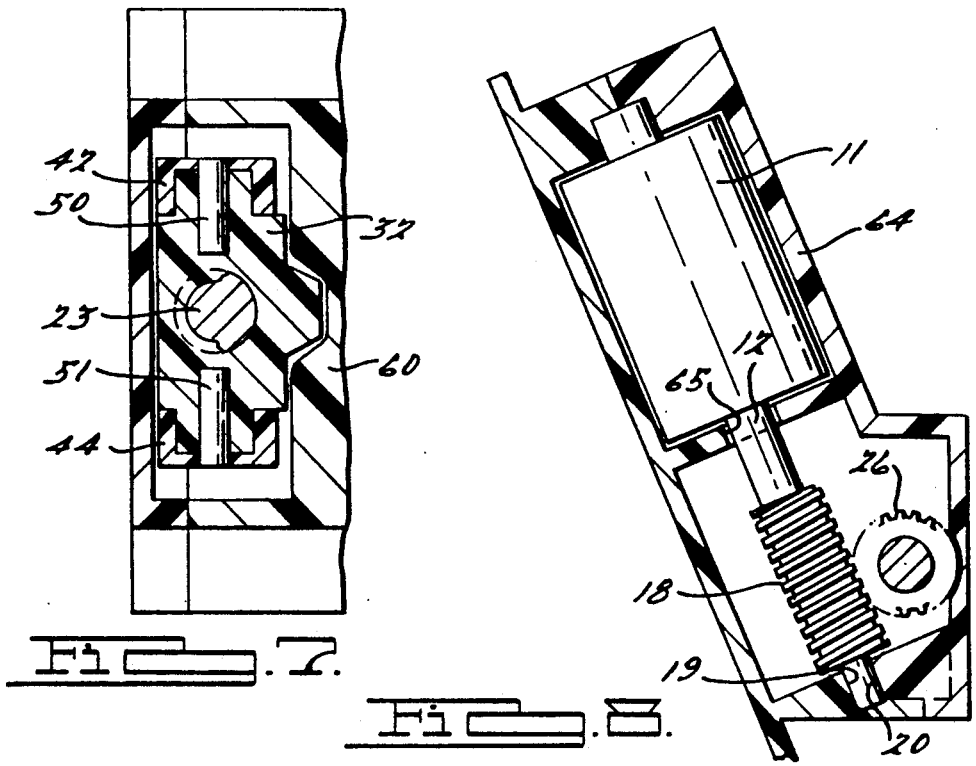
FIG. 7.
FIG. 8.

POWER WINDOW ACTUATOR

FIELD OF THE INVENTION

The present invention relates to a power window actuator and more particularly to a power window actuator for a swingably or pivotably mounted window such as a rear side vent or quarter window of a vehicle such as a van or the like.

BACKGROUND OF THE INVENTION

It is often desirable to provide a powered rear side vent or rear quarter window for ventilation purposes in vehicles, particularly vans and mini-vans. These rear side vent or quarter windows are generally swingably mounted and open outwardly of the vehicle body, and are typically remotely activated, as for example from the driver's seat.

Several types of vehicle power vent window actuators are known and used. Problems associated with these known types of window openers include their high cost, large and cumbersome size, and indirect drive arrangement employing cables with the motor being distant from the window. Thus, for example, U.S. Pat. No. 4,186,524 discloses a vehicle power window actuator for pivoting a glass view panel about an axis by means of back-and-forth linear movement of a wire cable. The wire cable has a jack screw portion swaged to one end engaging a gear which is rotated by an electric motor (which normally is placed in a location removed from the window such as in the trunk) to produce linear movement of the cable. The other end of the wire cable is swadge-attached to a rigid curved rod terminating in a ball-shaped end portion. The curved end is housed in an arcuate hollow support assembly which is attached to the vehicle body adjacent the movable edge portion of the window panel so as to direct the end portion of the curved rod against the panel. A connector assembly between the end portion of the curved rod and the window accommodates linear movement of the ball-shaped portion in a direction parallel with the plane of the glass as the window pivots outward. In addition, the end portion moves with and rotates with respect to the glass.

Likewise, U.S. Pat. No. 4,918,865 discloses a power window opener for operation of a quarter window of an automobile comprising an actuating device, an electric motor, and pull cable transmitting power from the motor (which is physically removed from the actuating device) to the actuating device. The actuating device has a pulley, a rotary shaft connected to the pulley, and a link mechanism for converting a rotational torque of the rotary shaft into an opening-and-closing force for a wing member of the window. The pull cables are connected with the pulley so that reciprocal pull operation through the motor causes reciprocal rotation of the pulley.

There is thus a need for a relatively simple, direct drive, inexpensive, and compact actuator for swingably mounted rear quarter power windows of vehicles such as vans and mini-vans. The present invention provides such an actuator.

SUMMARY OF THE INVENTION

In accordance with the present invention there is provided a vehicle power window direct drive actuator for pivoting a glass window about an axis. The actuator comprises a reversible motor driving a first gear means; a second gear means fixedly mounted on a screw spindle and engaged with the first gear means for transmitting the rotational force of said first gear means to said screw spindle; a follower axially movably disposed on said screw spindle which moves in an axial direction upon rotation of the screw spindle; a link attached at one end to said follower and at the other end to a connector assembly mounted on the window. Movement of the follower in an axial direction on the screw spindle causes a corresponding axial movement of the follower. Linear movement of the follower results in either a pushing force or pulling force, depending on the direction of movement of the follower, being exerted upon the connector assembly and, therefore, on the window, thus pivoting the window outwardly to an open position or inwardly to a closed position.

The actuator of the instant invention is a direct drive actuator. By direct drive actuator is meant that the driving device (motor) is located adjacent the window and transmits power to the connector assembly by means of gears and shafts, and, unlike the structures disclosed in U.S. Pat. Nos. 4,186,524 and 4,918,865, no cables are present as power transmitting members. Unlike an indirect drive actuator no power transmitting pull or push cables are utilized.

BRIEF DESCRIPTION OF THE DRAWINGS

FIG. 1 is a fragmentary and perspective view of the quarter window and the actuator, with the window in the open position;

FIG. 2 is similar to FIG. 1 except with the window in the closed position;

FIG. 5 is a sectional view taken along line 5—5 of FIG. 3;

FIG. 6 is similar to FIG. 5 except with the follower longitudinally displaced to the front of the screw;

FIG. 7 is a sectional view taken along line 7—7 of FIG. 3; and

FIG. 8 is a sectional view taken along line 7—7 of FIG. 3.

DETAILED DESCRIPTION OF THE PREFERRED EMBODIMENT

Figure 3:
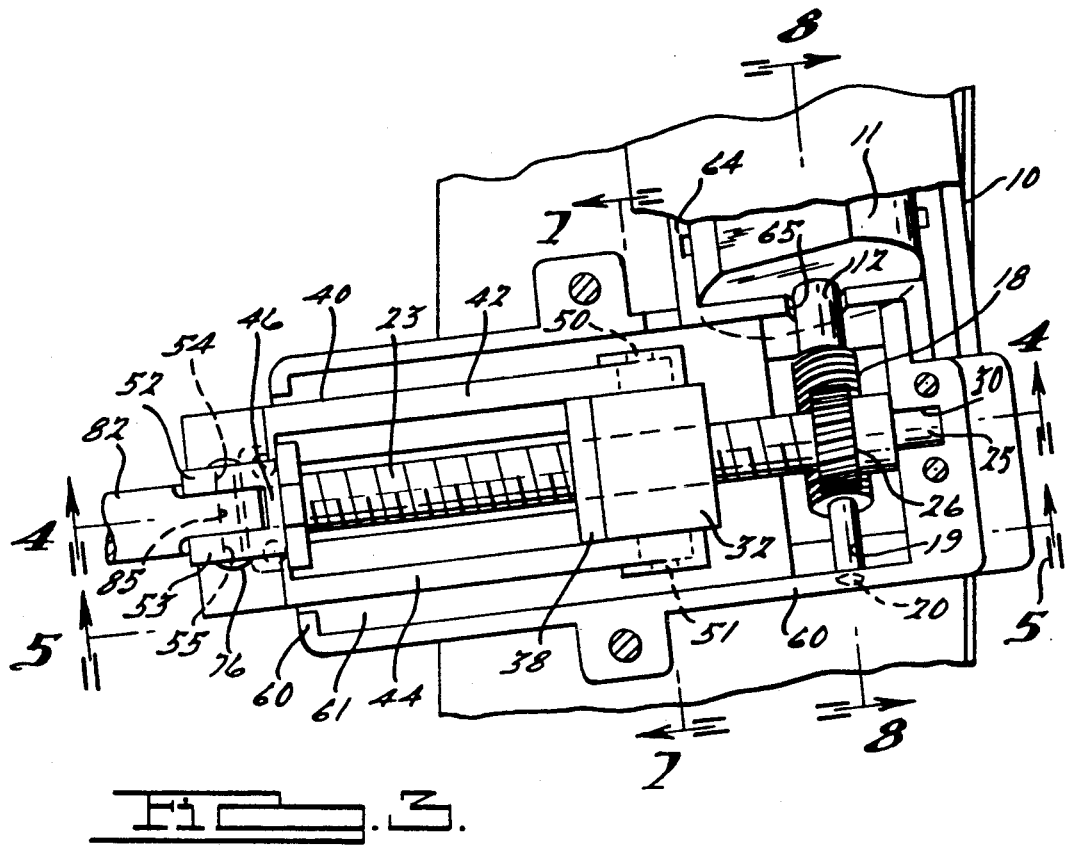
FIG. 3 is a fragmentary top plan view of the actuator.
Figure 4:
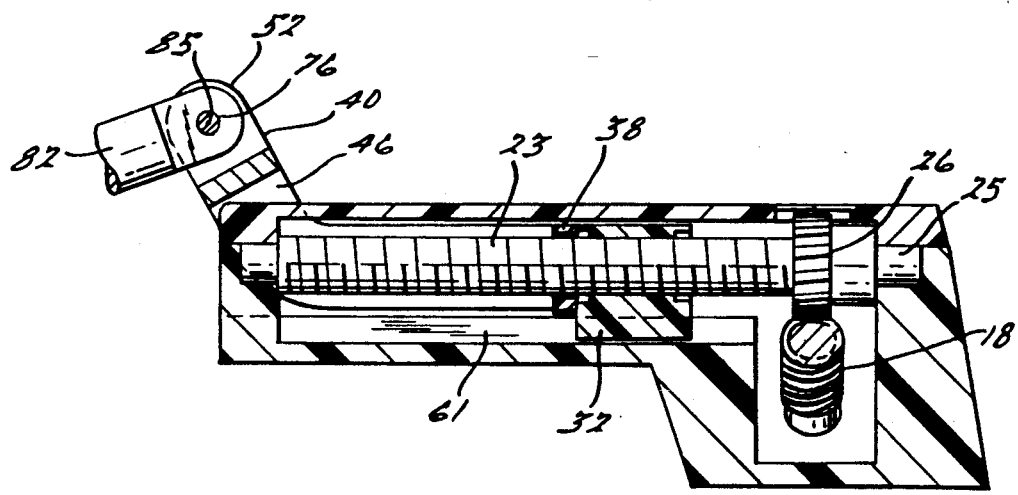
FIG. 4 is a sectional view taken along line 4—4 of FIG. 3.

In FIG. 1 of the drawings a portion of the rear, side interior of a vehicle is illustrated. The vehicle interior includes a side body panel portion 2. Rear side vent or quarter window 3 is mounted in the side body panel portion to swing laterally outward with respect to the body about an axis along the forward edge of the window. The swinging movement of the rear quarter window 3 is controlled by window actuator 10.

The window actuator 10 of the instant invention is mounted on a body portion of the vehicle, more particularly on the side sheet metal 5, for example on the side post or pillar 1, adjacent the rear edge of the window. The window actuator comprises a small electric motor 11 having an output shaft 12. The motor 10 is reversible and has circuit means associated therewith, including switch means for selectively activating the motor alternately in either direction at a switch location remote from the motor.

In the structure illustrated the output shaft 12 is operably connected to one end of gear shaft so that rotation of output shaft 12 causes corresponding rotation of gear shaft 18. The other end 19 of gear shaft 18 is rotatably mounted by means of bearing means 20 in housing 60 which also houses the electric motor 11. Bearing means 20 also function as a support bearing for the end 19 of gear shaft 28. It is to be understood that gear shaft 18 need not be separate from and attached to output shaft 12. Instead, output or drive shaft 12 may be constructed so as to contain gear means formed thereon.

Rotation of the gear shaft 18 drives externally threaded screw spindle 23 by means of a gear 26 fixedly disposed on screw spindle 23, which gear 26 is in operable engagement with gear shaft 18. In the structure illustrated in the drawings gear shaft 18 comprises a worm while gear 26 comprises a worm gear. The worm gear 26 meshes with the worm on gear shaft 18 and transmits the rotational force of the gear shaft 18 to the screw spindle 23 on which the worm gear is fixedly disposed. Screw spindle 23 is rotatably mounted at both ends 24, 25 in housing 60 by means of bearing means 28, 30. Thus, both ends of screw spindle 23 are supported by the housing. As best seen in FIG. 3 the longitudinal axis of screw spindle 23 is generally at right angles to the longitudinal axis of gear shaft 18. The thread of the screw spindle 23 is preferably an acme thread.

Follower 32 is axially or longitudinally displaceably mounted on screw spindle 23 and is provided with an internal thread corresponding to the external thread in screw spindle 23. Meshing of the external thread on screw spindle 23 with the internal thread in follower 32 upon rotation of screw spindle 23 causes axial displacement or movement of the follower 32 on the spindle. The direction of this axial displacement or movement depends upon the direction of rotation of the screw spindle 23.

A rubber bumper 38 is fixedly mounted to the front face 33 of the follower 32 in order to prevent the follower from binding or sticking in its leftward or forward travel in passageway 61 in housing 60.

A link member 40 is pivotally mounted on follower 32 and moves axially along screw spindle 23 with follower 32. Link member 40 comprises two spaced apart longitudinally extending arms 42 and 44. Arms 42 and 44 have upwardly extending angled portions 45, 46 at their front ends. A front cross member 46 connects angled portions 45 and 46 of arms 42 and 44. Arms 42 and 44 are generally parallel to each other. The link member 40 is pivotally attached to the sides of follower 32 at 50 and 51 at the rear ends of arms 42 and 44 respectively. Pivotal attachment of arms 42 and 44 to follower 32 can be accomplished by any known and conventional attachment means such as studs, pins, and the like.

The front cross member 46 has two spaced apart generally semi-circular shaped projections 52, 53 extending therefrom forming a clevis-like structure provided with holes 54 and 55 for receiving a pin or other fastening or securing member. By aligning these holes 54 and 55 with the hole 8 in the window mounted connector assembly rod 82, and then inserting a pin 76 through holes 54, 55 and 85, the connector assembly rod 82 and the link member 40 are rotatably joined to each other.

The window 3 pivots along the forward edge, and the movable rearward edge 4 tightly engages a weatherstrip 2 on pillar 1 when closed. The connector assembly 80 is mounted on the window 3, as best shown in FIGS. 1 and 2, adjacent the movable rearward edge 4 of window 3. The connector assembly includes connector assembly rod 82 and attaching bracket 84 fixed to the window glass pane 6.

The relative angular orientation between the glass plane and the longitudinal axis of screw spindle 23 changes during opening and closing of the window 3. To adjust for this change in angle the link member 40 is pivotally mounted on follower 32 as described above and the connector assembly 80 and link member are rotatably joined as described hereinafore.

The rotation axis of the link member 40 is parallel to the rotation axis of the window 3 so as to maintain proper alignment between the link member 40 and the window mounted connector assembly 82 in all operating positions.

For convenience of manufacture and assembly, the housing 60 is comprised of two sections, a top section 62 and a bottom section 63. The two sections 62 and 63 fit together and, when joined, define passageway 61 and chamber 64. Passageway 61 and chamber 64 are in communication with each other by means of opening 65 and, in the embodiment illustrated, are generally at right angles to each other. Motor 11 is disposed in chamber 64, while screw spindle 23, follower 32, rubber bumper 38, and part of link member 40 are disposed in passageway 61. The output shaft 12 and/or gear shaft 18 extend into passageway 61 through opening 65.

As best seen in FIGS. 1 and 2 the top section 62 of housing 60 has two longitudinally extending parallel openings 90, 91 therein. As best seen in FIG. 2 these two openings 90, 91 accommodate upward extending portions 45, 46 of arms 42, 44 of link members 40 upon withdrawal of the link member 40 into the housing to close the window.

The follower 32 is sized so as to fit within passageway 61 in a manner wherein it is free to move on screw spindle 23 in an axial or longitudinal direction within passageway 61, but it is prevented from rotational movement about the longitudinal axis of screw spindle 23. This results in follower 32 moving axially or longitudinally on screw spindle instead of rotating about screw spindle 23 upon rotation of the screw spindle.

In operation of the actuator of the instant invention when the motor 11 is switched on the output shaft 12 will rotate causing rotation of gear shaft 18 which is fixedly attached to the output shaft. Rotation of gear shaft 18 results in rotation of worm gear 26 and, consequently, rotation of screw spindle 23 on which the worm gear is fixedly mounted. Rotation of screw spindle 23 forces follower 32 to move axially forwardly in passageway 61. Forward movement of follower 32 in the passageway causes extension of link member 40 out of passageway 61. This extension of link member 40 exerts an outward force on window mounted connector assembly 80 thus pivoting window 3 outwardly to an open position.

Reversing the motor results in an opposite sequence of events. The screw spindle 23 rotates in a direction which causes follower 32 to move axially rearwardly in passageway 61. Rearward movement of follower 32 in the passageway retracts the link member 40 back into the passageway. This retraction of link member 40 exerts an inward pull on the connector assembly 80, thereby pivoting window 3 inwardly to a closed position.

This invention may be further developed within the scope of the following claims. Accordingly, the above specification is to be interpreted as illustrative of only a single operative embodiment of the present invention, rather than in a strictly limited sense.

We claim:

1. A direct drive powered window actuator to pivotally move a free edge of a side vehicle window between open and closed positions about an opposite hinge mounted edge comprising:

window connector means mounted on the glass pane of said window;

a housing mounted adjacent said free edge of said window on a body portion of said vehicle;

motor means producing a rotational torque disposed in said housing;

power transmitting means disposed in said housing operatively engaged at one end with said motor means and at the other end with said window connector means for converting the rotational torque produced to said motor means into an opening-and-closing force for said window connector means, said power transmitting means comprising:

a screw spindle rotatably disposed in said housing having one end operatively engaged with said motor means and rotatable by said motor means, a follower disposed in said housing and non-rotatably mounted on said screw spindle, said follower being longitudinally displaceable along said screw spindle upon rotation of said screw spindle, and a link member comprising two longitudinally extending transversely spaced apart parallel arms having front ends and rear ends, said arms being joined together at their front ends by a transversely extending cross-piece having attachment means for pivotally attaching said link member to said window connector means, said arms being pivotally attached at their rear ends to opposite sides of said follower.

2. The direct drive actuator of claim 1 wherein said motor means comprises a reversible electric motor.

3. The direct drive actuator of claim 1 wherein said screw spindle has a worm gear at the end thereof in engagement with said motor means.

4. The direct drive actuator of claim 3 wherein said motor means comprises a drive shaft including a worm which is in meshing engagement with said worm gear of said screw spindle.

5. The direct drive actuator of claim 1 wherein said follower is provided with a through hole through which said screw spindle passes, said hole being provided with an internal thread corresponding to the external thread on said screw spindle.

6. The direct drive actuator of claim 1 wherein said housing includes at least two bearing means, with said screw spindle being rotatably mounted at both ends in and supported by said bearing means.

7. The direct drive actuator of claim 1 wherein said arms are angled upwardly adjacent their front ends whereby said cross-piece lies in a different plane than the rear ends of said arms.

8. The direct drive actuator of claim 7 wherein said housing has two parallel longitudinally extending openings in its top surface only adjacent its front end through which the upwardly angled portions of said arms extend when said window is in the closed position.

9. The direct drive actuator of claim 8 wherein said follower has a rubber bumper mounted on its front face to prevent said follower from binding during longitudinal displacement on said screw spindle.

10. A direct drive actuator for pivotally opening and closing an automotive vehicle side window comprising:

window connector means mounted on the glass pane of said window;

a housing mounted adjacent said window;

a reversible electric motor disposed in said housing and having a drive shaft;

a screw spindle having a first end and a second end rotatably mounted in said housing and supported at both said first and second ends by bearing means in said housing;

means for operatively connecting said drive shaft with said screw spindle;

a follower disposed in said housing and non-rotatably but longitudinally movably mounted on said screw spindle;

a link member pivotally connected at one end to said follower and pivotally connected at the other end to said window connector means, said link member comprising a pair of longitudinally extending transversely spaced apart arms having front ends and rear ends, said arms being joined together at their front ends by a transversely extending cross-piece having attachment means for pivotally attaching said link member to said window connector means, said arms being pivotally attached at their rear ends to said follower.

11. The window actuator of claim 10 wherein said arms are curved upwardly adjacent their front ends whereby said cross-piece is disposed in a different plane than the rear ends of said arms.

12. The window actuator of claim 11 wherein said housing which includes a top and a front, has two longitudinally extending parallel openings in the top, adjacent its front, whereby said front ends of said arms extend outwardly from the interior of said housing through said openings.

13. The window actuator of claim 12 wherein said cross-piece is disposed exteriorly of said housing.

14. The window actuator of claim 13 wherein said follower has a rubber bumper attached to its front.

* * * * *